United States Patent
Lawrence et al.

(10) Patent No.: US 12,072,793 B2
(45) Date of Patent: Aug. 27, 2024

(54) FUNCTION RESULT PREDICTION

(71) Applicant: International Business Machines Corporation, Armonk, NY (US)

(72) Inventors: Mark James Lawrence, Eastleigh (GB); Aaron James Collins, Southampton (GB); Christopher John Swales, Southampton (GB); Charlie Parker, Warwick (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/552,419

(22) Filed: Dec. 16, 2021

(65) Prior Publication Data

US 2023/0195612 A1 Jun. 22, 2023

(51) Int. Cl.
*G06F 11/36* (2006.01)
*G06F 8/54* (2018.01)

(52) U.S. Cl.
CPC ............ *G06F 11/3692* (2013.01); *G06F 8/54* (2013.01); *G06F 11/3608* (2013.01); *G06F 11/362* (2013.01); *G06F 11/3664* (2013.01)

(58) Field of Classification Search
CPC ............ G06F 11/3692; G06F 11/3608; G06F 11/362; G06F 11/3664; G06F 8/54
USPC ................................................. 717/123–141
See application file for complete search history.

(56) References Cited

U.S. PATENT DOCUMENTS

| | | | | |
|---|---|---|---|---|
| 5,790,778 A * | 8/1998 | Bush | ................ | G06F 11/3612 714/34 |
| 6,407,753 B1 * | 6/2002 | Budinsky | ............ | G06N 5/022 715/764 |
| 7,178,136 B2 * | 2/2007 | Morgan | ............ | G06F 11/3664 717/124 |
| 7,668,800 B2 * | 2/2010 | Motoyama | ............ | G06Q 10/06 707/718 |
| 8,146,059 B2 | 3/2012 | Ponsford et al. | | |
| 8,321,257 B2 * | 11/2012 | Motoyama | ............ | G06Q 10/06 705/7.22 |
| 8,583,470 B1 * | 11/2013 | Fine | ................ | G06Q 40/04 705/7.31 |
| 8,930,350 B1 * | 1/2015 | Herscovici | ............ | G06F 16/951 707/723 |
| 9,021,445 B2 * | 4/2015 | Gataullin | ............ | G06F 11/3466 717/128 |
| 9,111,030 B1 * | 8/2015 | Dunn | ................ | G06F 16/24575 |

(Continued)

OTHER PUBLICATIONS

Uzunbayir et al, "A Review of Source Code Management Tools for Continuous Software Development", IEEE, pp. 414-419 (Year: 2018).*

Low et al, "Function Points in the Estimation and Evaluation of the Software Process", IEEE, pp. 64-71 (Year: 1990).*

(Continued)

*Primary Examiner* — Anil Khatri
(74) *Attorney, Agent, or Firm* — Peter J. Edwards

(57) ABSTRACT

A computer-implemented method, system, and computer program product for writing and checking functions of a code file in interactive development environments. The method may include, responsive to determining the function matches a historical function in a log of previously executed functions and their corresponding execution responses, identifying the execution response corresponding to the matching historical function in the log. The method may also include determining an expected result of the function based on the identified execution response.

17 Claims, 8 Drawing Sheets

(56) References Cited

U.S. PATENT DOCUMENTS

| | | | |
|---|---|---|---|
| 9,122,601 B2 | 9/2015 | Lindo et al. | |
| 9,323,644 B1* | 4/2016 | Hale | G06F 8/22 |
| 9,430,236 B2 | 8/2016 | Gschwind | |
| 9,563,845 B1* | 2/2017 | Porter | G06N 5/04 |
| 9,998,889 B2 | 6/2018 | Hosie | |
| 10,157,352 B1* | 12/2018 | Chan | G06N 5/047 |
| 10,718,031 B1* | 7/2020 | Wu | H04M 3/51 |
| 10,810,110 B1* | 10/2020 | Thomas | G06F 11/3664 |
| 10,824,549 B1* | 11/2020 | Desphande | G06N 20/00 |
| 10,853,178 B1* | 12/2020 | Pan | G06F 11/3055 |
| 10,853,481 B1 | 12/2020 | Magnuson et al. | |
| 10,936,585 B1* | 3/2021 | Echeverria | G06N 5/00 |
| 11,238,048 B1* | 2/2022 | Breeden | G06F 16/906 |
| 11,269,907 B1* | 3/2022 | Martino | G06F 3/0482 |
| 11,410,085 B1* | 8/2022 | Mudgil | G06F 18/24 |
| 2005/0071326 A1* | 3/2005 | Brown | G06F 16/986 707/E17.118 |
| 2009/0328005 A1 | 12/2009 | Miskelly | |
| 2012/0089964 A1 | 4/2012 | Sawano | |
| 2019/0171438 A1* | 6/2019 | Franchitti | G06N 20/00 |
| 2020/0118145 A1* | 4/2020 | Jain | G06Q 30/02 |
| 2020/0349133 A1* | 11/2020 | Dwarampudi | G06F 16/219 |
| 2021/0067366 A1* | 3/2021 | Silverstein | H04L 43/50 |

OTHER PUBLICATIONS

Albrecht et al, Software Function, Source Lines of Code, and Development Effort Prediction: A Software Science Validation IEEE, pp. 639-648 (Year: 1983).*

Buckley et al, "Software Quality Assurance", IEEE, pp. 36-41 (Year: 1984).*

Kim et al, "Automatic Abnormal Log Detection by Analyzing Log History for Providing Debugging Insight", IEEE, pp. 71-80 (Year: 2020).*

Zhang et al, "Robust Log-Based Anomaly Detection on Unstable Log Data", ACM, pp. 807-817 (Year: 2019).*

Asif et al, "Jiffy: A Framework for Encompassing Aspects in Testing and Debugging Software", IEEE, pp. 146-149 (Year: 2013).*

Khoshgoftaar et al, "Detection of Software Modules with High Debug Code Churn in a Very Large Legacy System", IEEE, pp. 364-371 (Year: 1996).*

Mell et al., "The NIST Definition of Cloud Computing," Recommendations of the National Institute of Standards and Technology, U.S. Department of Commerce, Special Publication 800-145, Sep. 2011, 7 pages.

* cited by examiner

FUNCTION RESULT PREDICTION

BACKGROUND

The present disclosure relates to the field of code management systems, and more particularly, systems and methods for writing and checking functions of a code file in interactive development environments.

In software development, functions are created and defined (for example, named) so that the long form of the function (for example, each action within the function) does not need to be coded each time the function is used, and instead only the name of the function may be needed. To use a function, the function may be called. Calling a function instructs the system to execute the actions of that function. When a function is called, a system may allocate some memory for that function call (for example, the function frames or function stacks). A function frame is a single function call. In some instances, there may be nested function calls. In these instances, the nested function calls warrant multiple frames, which forms a call stack (i.e., a stack of function frames). In conventional systems, call stacks may follow a last in, first out (LIFO) principle, which results in the most recent function's frame (i.e., the last in) to be pushed to the stack and become the active frame. This way, the most recent frame is executed and/or processed first. Once the function that corresponds to the active frame (for example, the most recent frame) is resolved and/or executed, the memory that pertains to the active frame may be released and the frame may be popped off the call stack, which may in some instances produce a return value. Popping a frame off the stack may be referred to as unwinding the stack.

SUMMARY

The present invention provides a computer-implemented method, system, and computer program product for writing and checking functions of a code file in interactive development environments. The method may include, responsive to determining the function matches a historical function in a log of previously executed functions and their corresponding execution responses, identifying the execution response corresponding to the matching historical function in the log. The method may also include determining an expected result of the function based on the identified execution response. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
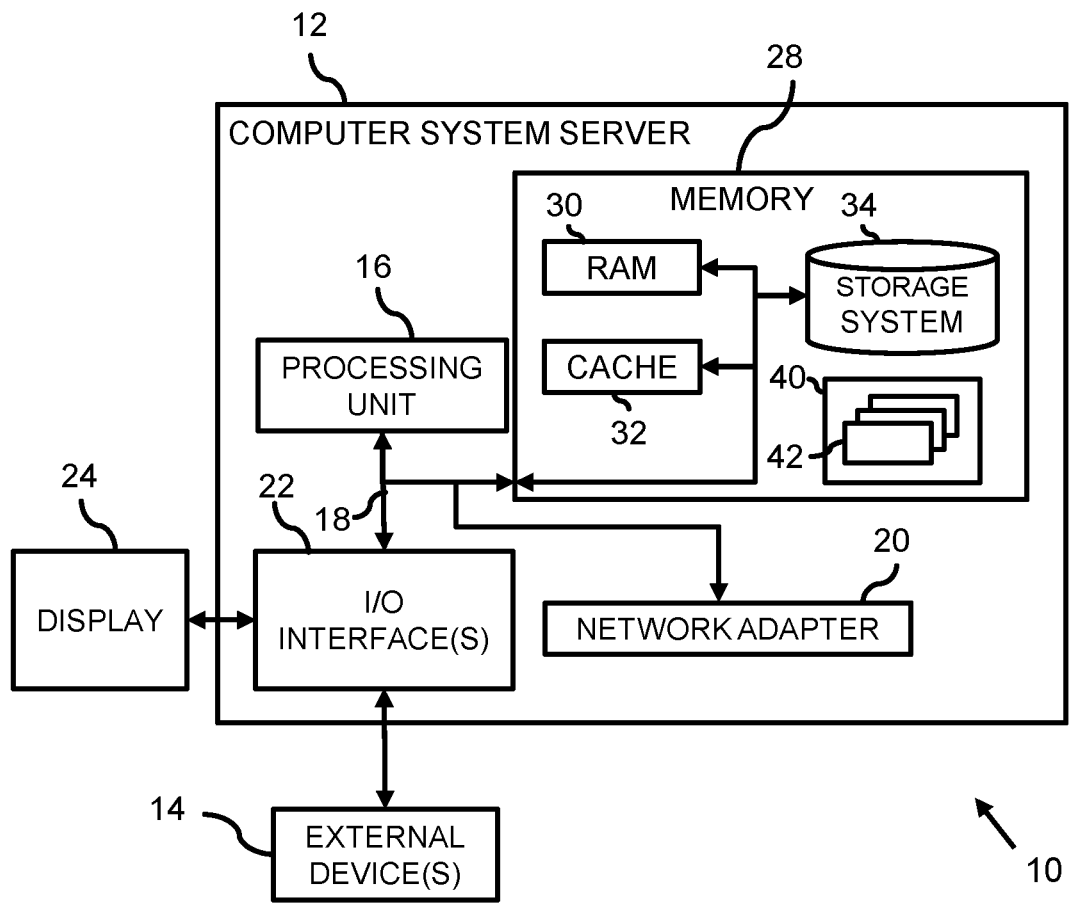
FIG. 1 depicts a cloud computing node according to embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

When a developer writes a new line of code that calls a function, whether that be within an application or a test code, the function may have been previously called within the context of that application or test suite. In the case where the parameters passed to the function are dynamic, the parameters are only known at runtime, meaning that at the time of writing the new function call, the result of that function call is unknown. Indeed, in the case where constant values are passed as parameters to the function call, even if the function has been run before with those same constant values, the output of the function call may not be known to a user, for example when a new user accesses a code file.

It is often the case that a developer writes a function call and does not know the exact output of those functions until runtime. If the developer unwittingly passes in parameters previously seen to have thrown an exception in the function, then the developer will not be informed of the error until they are presented with the exception when the code is run. There is therefore a need for an improved means of managing and checking functions in a code file.

The present invention seeks to provide a method for obtaining an expected result of a function in a code file. The present invention also seeks to provide a method for generating a log of previously executed functions and their corresponding execution responses. Both methods provide improved means of managing and checking functions in a code file. Such methods may be computer-implemented. That is, such methods may be implemented in a computer infrastructure having computer executable code tangibly embodied on a computer readable storage medium having programming instructions configured to perform a proposed method. The present invention further seeks to provide a computer program product including computer program code for implementing the proposed concepts when executed on a processor. The present invention yet further seeks to provide a system for obtaining an expected result of a function in a code file. The invention also seeks to provide a system for generating a log of previously executed functions and their corresponding execution responses.

Thus, there may be proposed concepts for obtaining an expected result of a function in a code file, which may be performed at a centralized or distributed coding system. Expected results for functions may be determined based on a historical function in a log of previously executed functions and their corresponding execution responses. Providing such automated function result predictions in a code file may aid a user in preparing a code file by alerting a user to potential exceptions in the functions before the functions are run.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

The technical character of the present invention generally relates to function prediction, and more particularly, to methods for obtaining an expected result of a function, for example, within a code file accessed by a user. More specifically, embodiments of the present invention provide concepts for obtaining an expected result of a function in a code file, the method comprising, responsive to determining the function matches a historical function in a log of previously executed functions and their corresponding execution responses, identifying the execution response corresponding to the matching historical function in the log; and determining an expected result of the function based on the identified execution response.

The invention provides a means of obtaining an expected result of a function based on a previous instance of a similar function having been performed. In this way, the process of writing functions in a code file may be made more efficient as previous results, such as exceptions, may be used as the expected result of a newly written function. Thus, the user may adjust the function accordingly. Alternatively, the expected result may be used to confirm to the user that the function will behave as performed.

In other words, the method provides a means of monitoring similar functions that are repeated over time in order to leverage the previously seen execution results to generate an expected result of a newly entered similar function.

It has been recognized that software development, particularly when focusing on a specific area of software development, often relies on using a given function multiple times. If each similar function must be tested individually every time it is written, the development time increases significantly. By utilizing the stored execution results of previously executed functions to predict the response to a newly written similar function, the need of such extensive testing may be reduced, thereby reducing the development time required.

In an embodiment, obtaining the expected result occurs before the function in the code file is run. In this way, the expected result of the function may be obtained without having to run the function, thereby increasing the efficiency of the method.

In an embodiment, the method further comprises generating a visual representation of the expected result to be provided to a user. In this way, a user may be alerted to the expected result in a visual manner.

In a further embodiment, the visual representation of the expected result is provided at the function in the code file. In this way, the user may be provided with the expected result in the context of the function, thereby improving the legibility of the expected result.

In an embodiment, the method comprises: identifying a plurality of functions in the code file; for each of the plurality of functions, determining whether the function matches a historical function in the log; responsive to determining one or more of the plurality of functions matches one or more historical functions in the log: identifying one or more execution responses corresponding to any matching historical functions in the log; and determining one or more expected results of the plurality of functions based on the identified execution responses. In this way, the expected results of a plurality of functions may be obtained for a code file. For example, a newly imported code file comprising a plurality of functions may be analyzed immediately on opening according to the method.

In an embodiment, the method further comprises generating the log over time. In this way, the log may be progressively and dynamically generated over time based on the functions executed by the user.

In a further embodiment, generating the log comprises: executing a function; obtaining an execution response to the function; and logging the function as a historical function in the log. In a further embodiment, generating the log further comprises logging the execution response corresponding to the historical function in the log. In a further embodiment, the function is performed in: a debug mode; or a test mode.

In an embodiment, the method further comprises obtaining one or more historical parameters for executing the historical function, and wherein the log further comprises the one or more historical parameters.

In a further embodiment, the function in the code file comprises one or more parameters for executing the function, and wherein the method further comprises: comparing the one or more parameters to the one or more historical parameters; and determining the function matched a historical function in the log based on the comparison. In this way, the accuracy of the expected results may be improved.

In an embodiment, the method comprises: receiving a new function at the code file by way of a user input; responsive to determining the new function matches a historical function in the log; identifying the execution response corresponding to the matching historical function in the log; and determining an expected result of the new function based on the identified execution response. In this way, the method may provide a means of providing an expected result dynamically in response to a user writing a new function.

In an embodiment, the function in the code file comprises one or more subsidiary functions, and wherein the method further comprises: responsive to determining the one or more subsidiary functions match one or more historical functions in the log; identifying the execution responses corresponding to the one or more matching historical functions in the log; and predicting an expected result of the function based on the identified execution responses. In this way, an expected result for a complex function may be predicted based on the results of one or more previously performed subsidiary, i.e. less complex, functions.

Embodiments of the present invention provide further concepts for generating a log of previously executed functions and their corresponding execution responses, the method comprising: executing a function; obtaining an execution response to the function; logging the function as a historical function in a log; and logging the execution response corresponding to the historical function in the log.

In a further embodiment, the method further comprising obtaining an expected result of a function in a code file, wherein obtaining the expected result method comprises: responsive to determining the function matches a historical function in a log of previously executed functions and their corresponding execution responses: identifying the execution response corresponding to the matching historical function in the log; and determining an expected result of the function based on the identified execution response.

Embodiments of the present invention provide a computer program product for obtaining an expected result of a function in a code file, the computer program product comprising a computer readable storage medium having program instructions embodied therewith, the program instructions executable by a processing unit to cause the processing unit to perform a method comprising: responsive to determining the function matches a historical function in a log of previously executed functions and their corresponding execution responses: identifying the execution response corresponding to the matching historical function in the log; and determining an expected result of the function based on the identified execution response.

Embodiments of the present invention provide a further computer program product for generating a log of previously executed functions and their corresponding execution responses, the computer program product comprising a computer readable storage medium having program instructions embodied therewith, the program instructions executable by a processing unit to cause the processing unit to perform a method comprising: executing a function; obtaining an execution response to the function; logging the function as a historical function in a log; and logging the execution response corresponding to the historical function in the log.

Embodiments of the present invention provide concepts for a processing system comprising at least one processor and the computer program product described above, wherein the at least one processor is adapted to execute the computer program code of said computer program product.

Embodiments of the present invention provide a system for obtaining an expected result of a function in a code file, the system comprising: a processor arrangement configured to, responsive to determining the function matches a historical function in a log of previously executed functions and their corresponding execution responses, perform the steps of: identifying the execution response corresponding to the matching historical function in the log; and determining an expected result of the function based on the identified execution response.

Embodiments of the present invention provide a further system for generating a log of previously executed functions and their corresponding execution responses, the system comprising: a processor arrangement configured to: execute a function; obtain an execution response to the function; log the function as a historical function in a log; and log the execution response corresponding to the historical function in the log.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components, such as system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 80 can be implemented as one or more of the program modules 42. Additionally, the DHCP client 80 may be implemented as separate dedicated processors or a single or several processors to provide the functionality described herein. In embodiments, the DHCP client 80 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
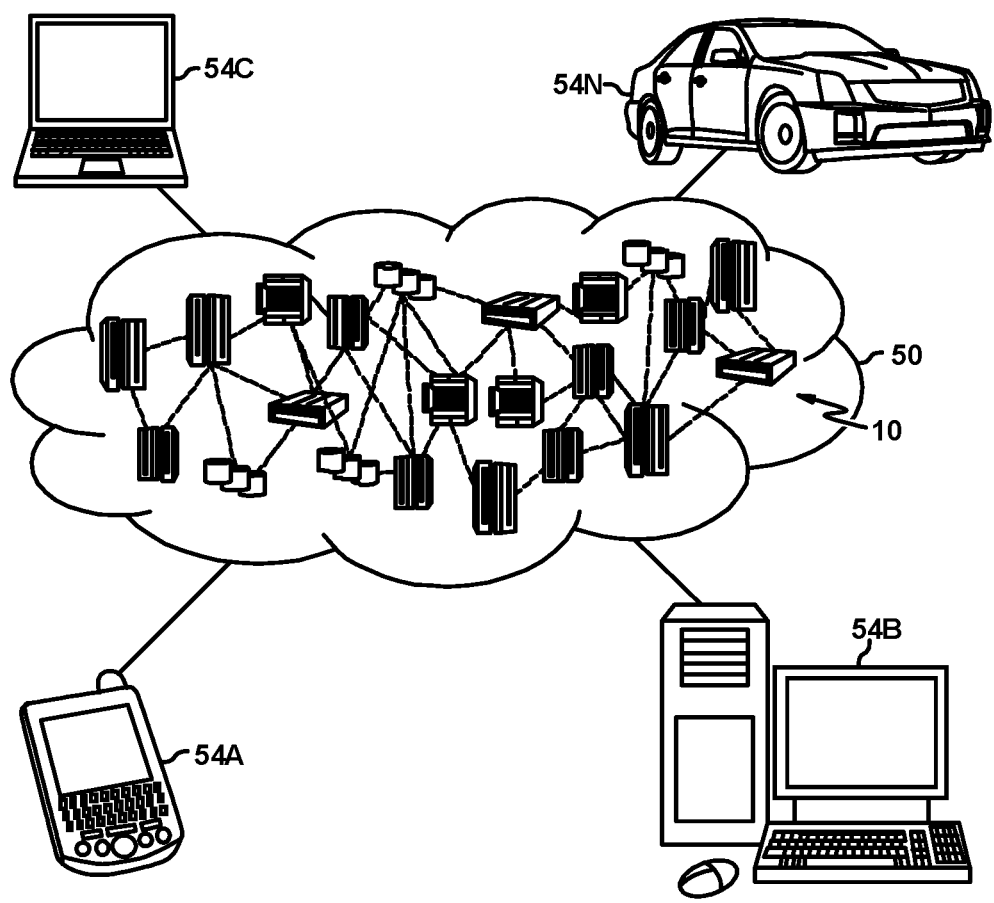
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
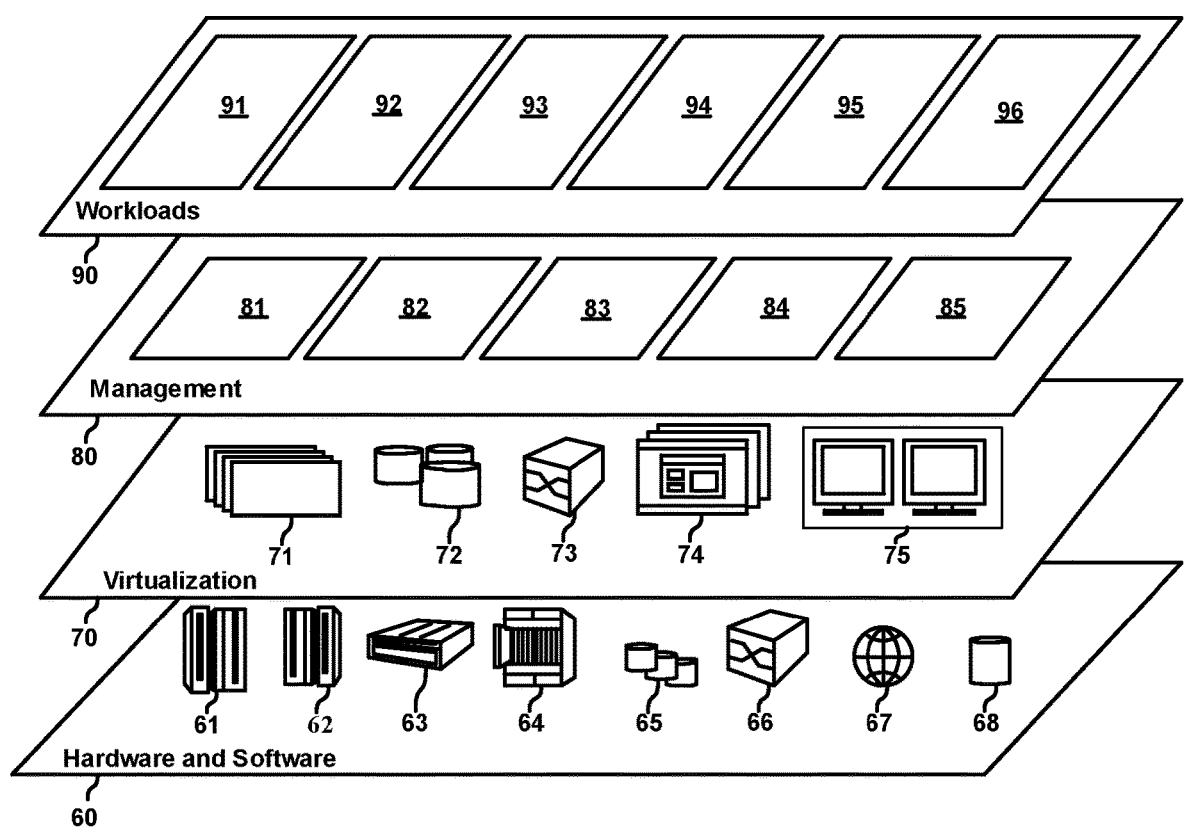
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and expected function prediction processes 96 described herein. In accordance with aspects of the invention, the expected function prediction processes 96 workload/function operates to perform one or more of the processes described herein.

Figure 4:
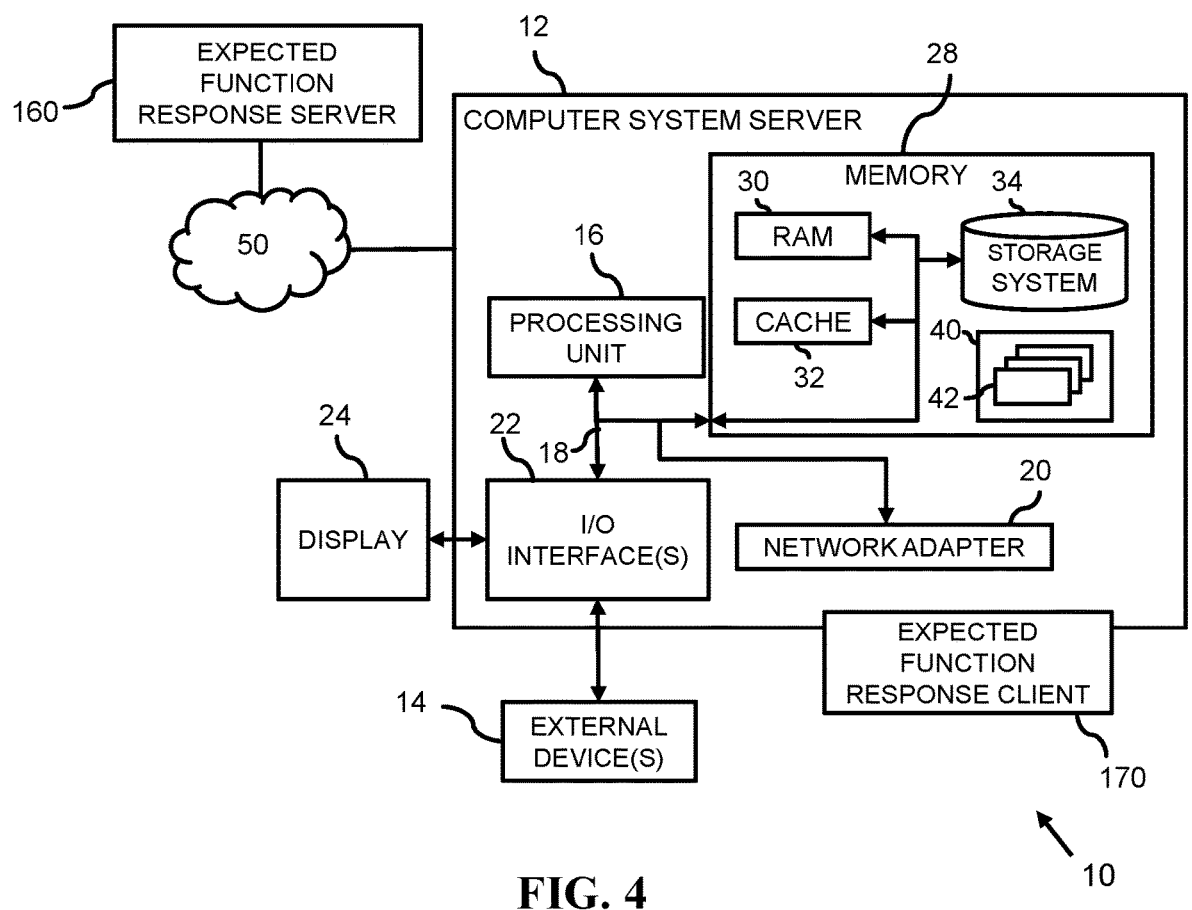
FIG. 4 depicts a cloud computing note according to embodiments of the present invention.

FIG. 4 depicts a cloud computing node according to another embodiment of the present invention. In particular, FIG. 4 is another cloud computing node which includes a same cloud computing node 10 as FIG. 1. In FIG. 4, the computer system/server 12 also comprises or communicates with an expected function response client 170, and an expected function response server 160.

In accordance with aspects of the invention, the expected function response client 170 can be implemented as one or more program code in program modules 42 stored in memory as separate or combined modules. Additionally, the expected function response client 170 may be implemented as separate dedicated processors or a single or several processors to provide the function of these tools. While executing the computer program code, the processing unit 16 can read and/or write data to/from memory, storage system, and/or I/O interface 22. The program code executes the processes of the invention.

By way of example, expected function response client 170 may be configured to communicate with the expected function response server 160 via a cloud computing environment 50. As discussed with reference to FIG. 2, for example, cloud computing environment 50 may be the Internet, a local area network, a wide area network, and/or a wireless network. In embodiments of the proposed expected function response mechanism, the expected function response server 160 may provision data to the client 170. One of ordinary skill in the art would understand that the expected function response client 170 and expected function response server 160 may communicate directly. Alternatively, a relay agent may be used as an intermediary to relay messages between expected function response client 170 and expected function response server 160 via the cloud computing environment 50.

Figure 5:
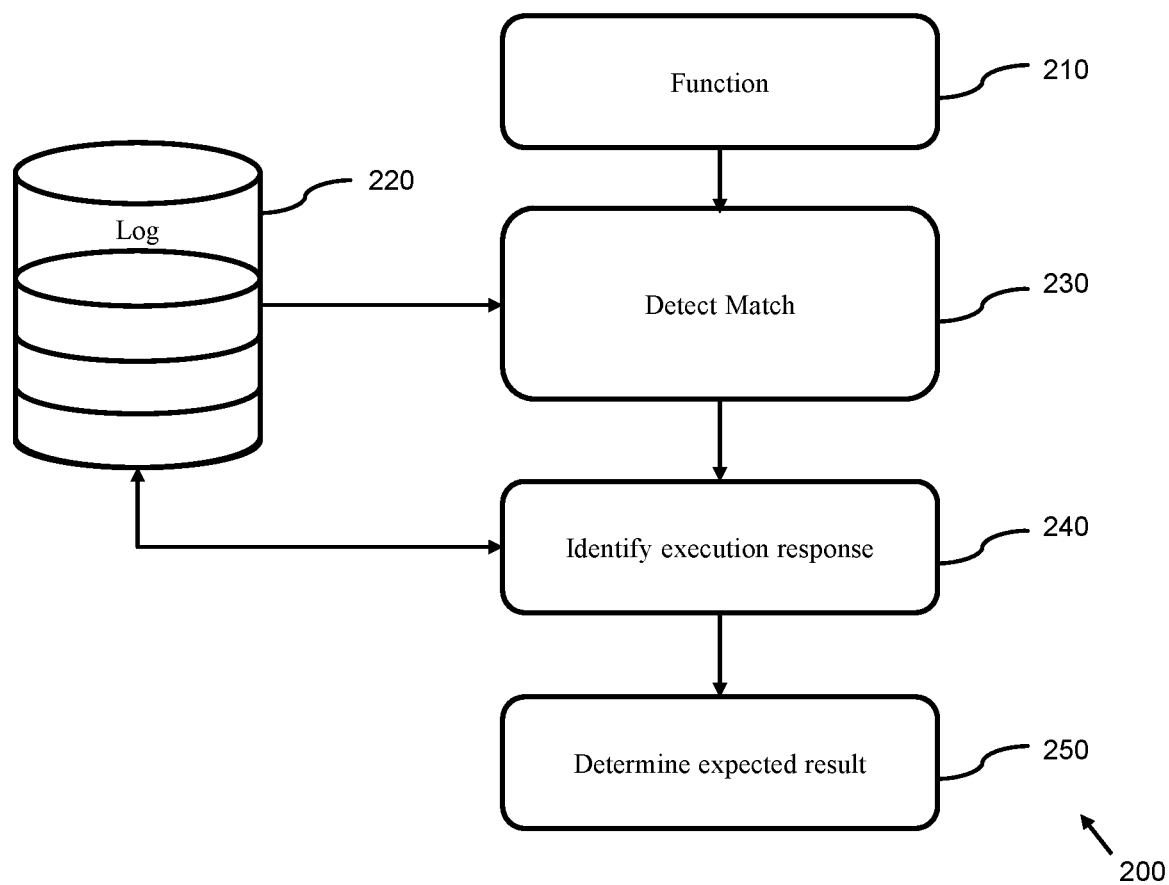
FIG. 5 depicts a simplified schematic representation of a method for obtaining an expected result of a function in a code file according to embodiments of the present invention.

FIG. 5 shows a simplified schematic representation of a method 200 for obtaining an expected result of a function in a code file.

When a function 210 is received, or detected, at a code file, the function may be compared to historical functions stored in a log 220 of previously executed functions and their corresponding execution responses. Responsive to determining/detecting 230 that the function matches a historical function in the log, the execution response corresponding to the matching historical function is identified 240.

The expected result of the function 210 may then be determined 250 based on the identified execution response of the matching historical function.

As will be described in further detail below, the log may be generated over time by recording the functions and the results of executing the functions in the log. Once a record of the historical functions and their execution responses exist in the log, when code files are opened in an interactive development environment (IDE), the code file may be scanned to see if any of the functions, and optionally the function parameters, contained in the file match up to any of the historical functions listed in the log.

Should any of the functions in the code file match with the historical functions in the log, then the IDE may be adapted to provide the user with an expected result for the functions. By way of example, the IDE may visually display the expected result, for example, using an icon in the sidebar or a hover-over popup.

In other words, the method may further comprise generating a visual representation of the expected result to be provided to a user. The visual representation of the expected result may then be provided at the function in the code file for the user to view within the context of the code file.

The scanning and matching of the functions in the code file may occur whilst a developer is writing new code, meaning that immediate feedback may be received by the user on the expected response when they write a function call that matches a historical function in the log. In other words, the expected result may be obtained before the function in the code file is run, thereby providing the developer with feedback without having to run the function and look for exceptions. In other words, when a new function is provided at the code file by way of a user input, the new function may be immediately compared to the historical functions in the log to determine whether a match exists.

Accordingly, the invention provides a means of making the development process quicker and more efficient for any software development team, as engineers can receive real time feedback for certain function calls when writing code, without having to debug or run a test first.

When writing a function, it is often the case that parameters for the function need to be defined by the user. These parameters may be either dynamic parameters, which change over time or each time the code is run, or constant parameters, which are constant regardless of the number of times the code is run.

According to an example embodiment, the method 200 described above may further include obtaining one or more historical parameters for executing the historical function, which may be stored in the log 220 along with the historical functions and their execution responses. Then, when a function is provided at the codes file, where the function comprises one or more parameters for executing the function, the method may further comprise the steps of comparing the one or more parameters to the one or more historical parameters and determining the function matches a historical function in the log based on the comparison.

In other words, the comparison between the function and the log of historical functions may be based on the parameters used to execute the function as well as the function itself. In this way, the comparison between the function and the historical function is more accurate, meaning that the expected result will be more accurate.

It should be noted that the methods described above may be applied to one function in a code file or a plurality of functions in a code file. In the case where a plurality of functions of a code file have not been compared to the log of historical functions, the method may further comprise identifying a plurality of functions in the code file and, for each of the plurality of functions, determining whether the function matches a historical function in the log.

Responsive to determining one or more of the plurality of functions matches one or more historical functions in the log, the execution responses corresponding to any matching historical functions in the log may be identified and used to determine the expected results of the plurality of matching functions.

Further, a given function, or parent function, may include one or more subsidiary functions that are called in order to fulfill the parent function. In the case where a function in the code file comprises one or more subsidiary functions, the method may further comprise comparing the one or more subsidiary functions to the log of historical functions.

Responsive to determining the one or more subsidiary functions match one or more historical functions in the log, the execution responses corresponding to the one or more matching historical functions may be identified in the log and the expected result of the function may be predicted based on the identified execution responses.

In other words, the expected results of executing the one or more subsidiary functions may be determined based on the execution responses retrieved from the log and then used to predict the outcome of the parent functions.

Put another way, the method may provide a means of determining an expected end result in code that contains back-to-back calls to functions that match historical functions present in the log. For example, in a line of code a function is called, and the output of that function is passed as a parameter to a function on the following line. If both functions match historical functions in the log and an entry for the historical function exists in the log using the same parameters, an estimated result for the combination of calling those two functions can be generated and displayed to the user in the IDE.

Figure 6:
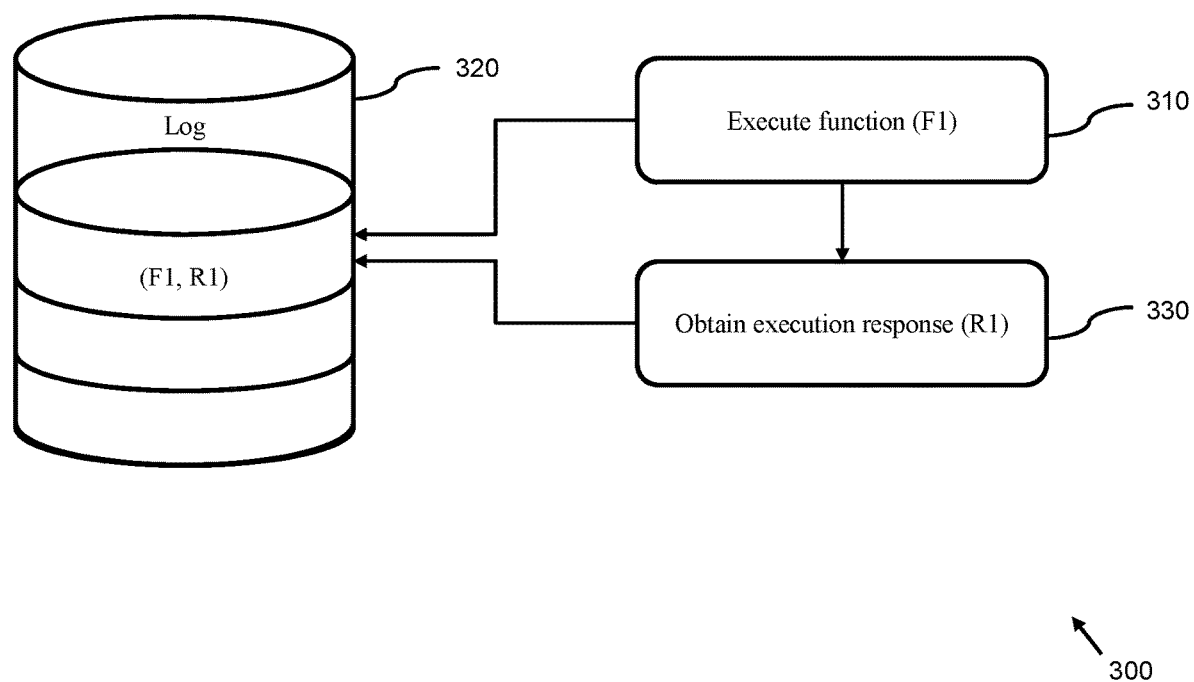
FIG. 6 depicts a simplified schematic representation of a method for generating a log of previously executed functions and their corresponding execution responses according to embodiments of the present invention.

FIG. 6 shows a simplified schematic representation of a method 300 for generating a log of previously executed functions and their corresponding execution responses. This method may be repeated for each function executed on a system implementing an aspect of the invention.

The method begins in step 310 by executing a function, F1, which is logged in the log 320 as a historical function. In addition to the function, any parameters provided for the execution of the function may also be logged in the log as historical parameters. The function may be executed in a debug mode or a test mode.

An execution response, R1, to the executed function is then obtained 330 and logged in the log 320 with the historical function.

As this method is repeated over time, the log 320 will be populated with a plurality of historical functions, their corresponding execution responses and the parameters used to execute the historical functions. Therefore, as more functions are executed, the more likely it will be that a new function will find a matching historical function in the log.

In other words, when the code file runs, either in debug or as part of a running automated test, the call stack of functions is continually logged to a log 320 available to the IDE. As a program is executed, the logging of the call stack of functions will mean that there is a record for every single function call made during the run of the program and the test, as well as the input parameters for each function.

Once the function records exist in the log, when a further code file is opened in the IDE, the whole code file may be scanned to see if any of the functions and their parameters contained in the file match up to any of the historical functions listed in the log. Should any functions match with the historical functions in the log, the IDE may visually display the expected result of the function, as derived from the execution result of the matching historical function, for example by way of an icon in the sidebar or a hover-over popup.

The process of scanning the code file and matching the functions to the historical functions in the log may also occur whilst a developer is writing new code. Accordingly, the developer may receive immediate feedback on the expected response of the function when they write a function call with parameters that are not dynamic, such as fixed values or variables that are assigned fixed values.

The log may then be used to help determine the expected response to a function present in the code file as described above with reference to FIG. 5 or as described below with reference to FIGS. 7 and 8.

Figure 7:
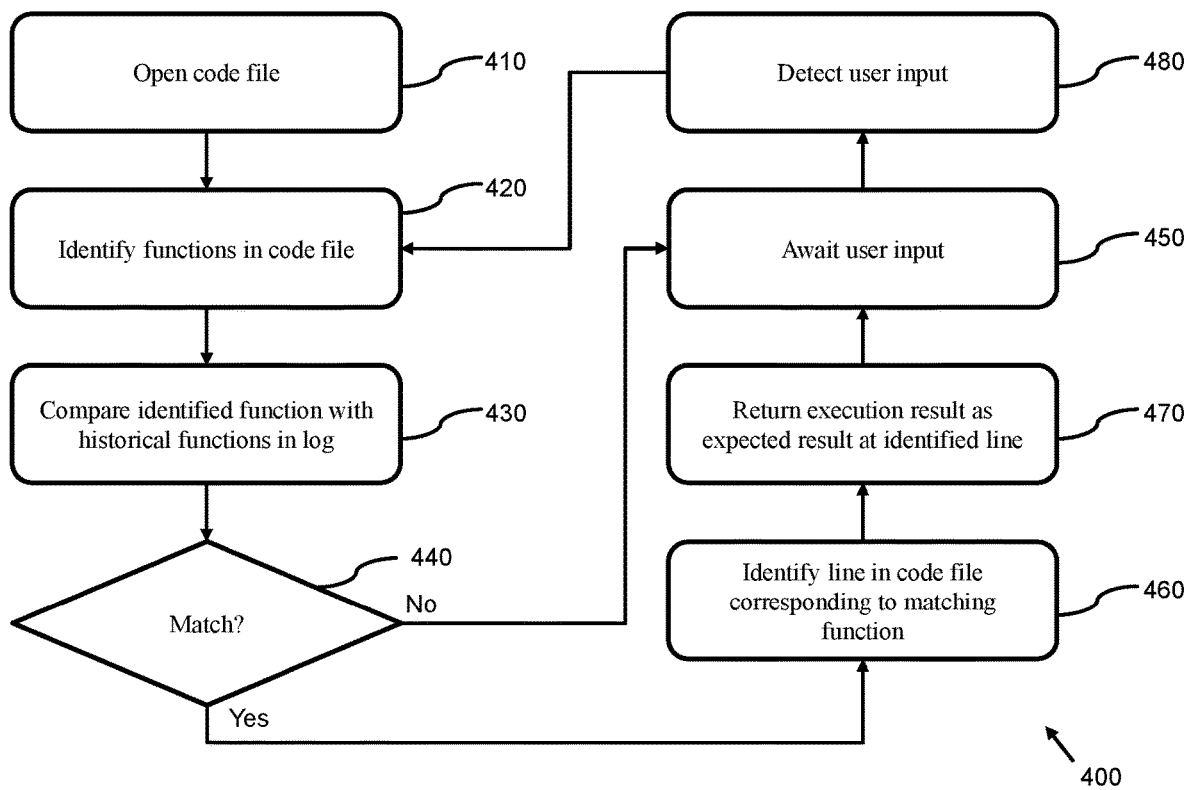
FIG. 7 depicts an example of a method for obtaining an expected result for function in a code file according to embodiments of the present invention.

FIG. 7 shows an example of a method 400 for obtaining an expected result for function in a code file according to an aspect of the invention.

The method begins in step 410 when a code file is opened by a user. The code file may then be scanned by the IDE used to open the code file and any functions within the code file are identified in step 420. The functions identified in the code file in step 420 may then be compared with the historical functions in the log in step 430.

If it is determined in step 440 that no match exists between the functions in the code file and the historical functions in the log, the method may progress to step 450 where the process awaits further user input.

However, if is determined in step 440 that a match exists between a function in the code file and a historical function in the log, the method may progress to step 460, wherein the line, or lines, of the code file occupied by the matching function is identified. The expected result may then be returned at the identified line at step 470.

In a particular example, for any matching functions found, if the parameters passed to the function in the code file match the historical parameters passed into the historical function within log, a full match is considered to be found and the execution response for historical function may be extracted as the expected response.

The method may then progress to step 450 to await further user input. When the developer writes a new function, the user input may be detected in step 480 and the method may then return to step 420 to identify the new function. The method may then repeat to cross reference the new function with the log to see if the function has been called before with the same parameters. If so, step 460 runs again but for the new line of code. With valid mappings of historical functions to their execution responses, expected responses for new functions can be inferred as they are written. In other words, by linking such historical functions to their associated cached execution responses in the log, new functions can be modelled during development and said models can be leveraged to forecast expected responses for functions being developed.

Figure 8:
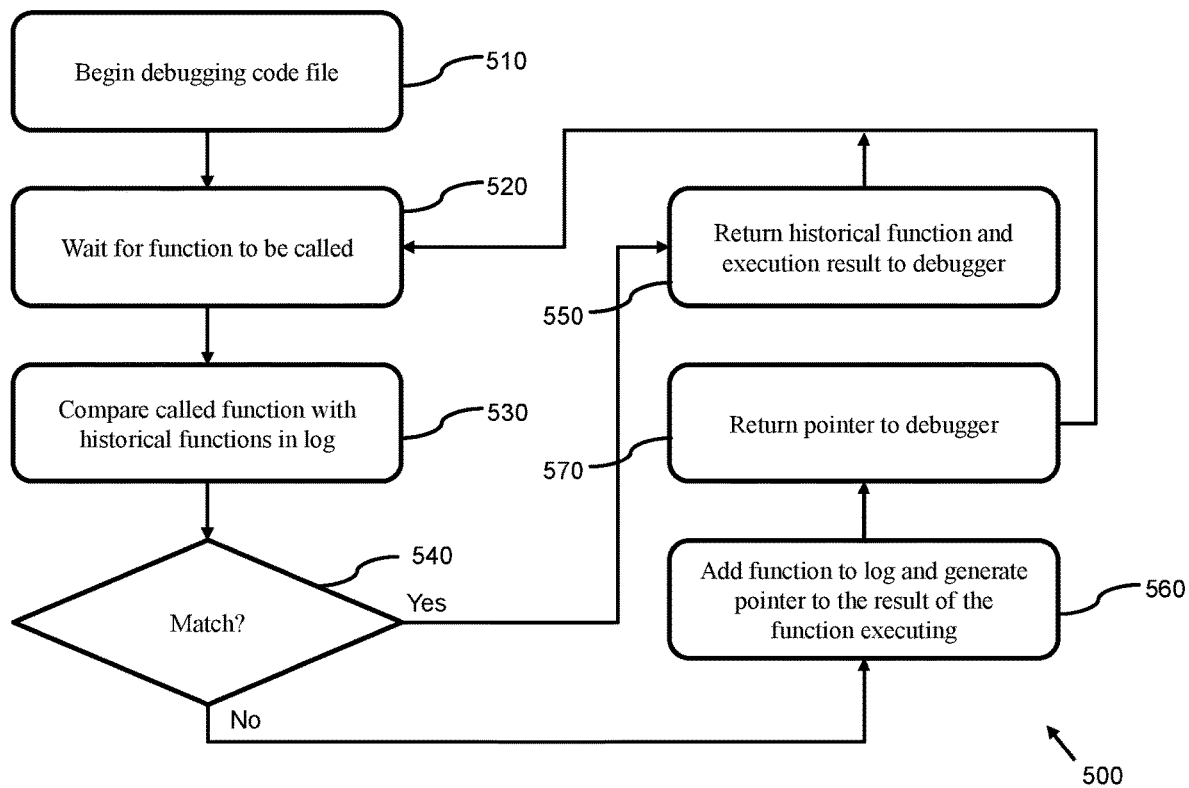
FIG. 8 depicts an example of a method for debugging a code file according to embodiments of the present invention.

FIG. 8 shows an example of a method 500 for debugging a code file according to an aspect of the invention.

The method may begin in step 510 by initiating the debugging of the code file. The method then progresses to step 520 to await a function to be called by the debugger. When a function is called by the debugger, the function is compared 530 with the historical functions in the log.

If it is determined in step 540 that a match exists between the called function and a historical function in the log, the method may progress to step 550 where the historical function and the execution result of the historical function are returned to the debugger.

However, if it is determined in step 540 that no match exists between the called function and a historical function in the log, the method may progress to step 560, where the called function is added to the log as a historical function for future reference. In addition, a pointer is generated which points to the output of the called function. The pointer is then returned to the debugger in step 570 so that, when the function has been executed, the debugger may obtain the execution result and add it to the log with the historical function for future reference.

The method may then return to step 520 and repeat for as many times as there are functions called by the debugger.

For the purpose of further illustration, there is provided below a brief worked example of a method of the invention.

In this example, the developer is aiming to write a function that retrieves the total amount of disk space available on a large number of servers in a given region. The developer writes the new and untested function (get_disk_space_europeo), which makes use of two well tested functions (get_servers(region)) and (disk_space(server)), each with multiple entries in the log with different associated arguments, return values and frames.

In this worked example, in a previous run of the (get_servers(region)) function, where (Europe) was passed to the function as an argument, the function produced a list of 10 European servers. For the sake of the example, all of the servers in the returned list from the aforementioned function call have previously been tested as arguments of the disk_space function and this information is stored in the backend.

By transposing the function call for the historic return values, an anticipated return value could be presented to the developer as they write the function even though the function might take a considerable amount of time to run and has never been run before. After transposition, in this example, the function (get_disk_space_europeo) is simply adding 10 numbers to the list of European servers, which could be done quickly in the background with insights produced and displayed at the IDE level to the developer.

In this example, the functions used may be non-deterministic, relying on API calls with return values that change based on the state of the servers. Discrepancies in the return values from stored frame entries that are otherwise identical would be able to infer that such a change has occurred and this information could be displayed to the user if desired.

In an extension of the example, it may be possible to not only implement an expected response value for new functions in a fraction of the time that said function would take to execute, but to also provide additional metrics relating to the execution of the matching historical functions, such as historical moving averages.

By way of example, the developer discussed above may write a function like (get_disk_space_europe) in order to start tracking disk usage in a region over time. By utilizing the methods discussed above, the expected result returned to the developer may be able to, in effect, retrospectively and efficiently run the new function using frame data in persistent storage (i.e., the log) to give the developer a set of historic values over time, for example with a trend, before the function is executed.

The methods of the invention discussed above may facilitate efficient development while minimizing computationally, or otherwise, expensive function executions by using past results as exact or best guess approximations. In this way, the methods of the invention may reduce development costs (by reducing the need for API calls), reduce the amount of time need for writing mock tests, improve the feasibility of developing in an air gapped or offline environment and alter the developer to logic errors at write time if an expected response return value radically differs from the developer's expectation.

It should now be understood by those of skill in the art, in embodiments of the present invention, the proposed concepts provide numerous advantages over conventional expected function result prediction approaches. These advantages include, but are not limited to, efficient and accurate identification of an expect result of a function based on a log of historical functions and their corresponding execution responses.

In still further advantages to a technical problem, the systems and processes described herein provide a computer-implemented method for efficient expect function result predictions, which may be provided on (or via) on a distributed communication network. In this case, a computer infrastructure, such as the computer system shown in FIGS. 1 and 4 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:
  (i) installing program code on a computing device, such as computer system shown in FIG. 1, from a computer-readable medium;
  (ii) adding one or more computing devices to the computer infrastructure and more specifically the cloud environment; and
  (iii) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for obtaining one or more expected results of a plurality of functions in a code file, the plurality of functions comprising a first function and a second function, the method comprising:
   determining whether the first function and the second function matches at least one of a one or more historical functions in a log of previously executed functions and their corresponding execution responses;
   responsive to determining that at least one of the first function and the second function matches at least one of the one or more historical functions in the log, resulting in one or more matching historical functions:
   identifying one or more execution responses corresponding to the one or more matching historical functions in the log;
   determining one or more expected results of the plurality of functions based on the identified one or more execution responses;
   generating a visual representation of the one or more expected results in an interactive development environment; and
   executing at least one of the first function and second function.

2. The computer-implemented method of claim 1, wherein determining the expected result occurs before the plurality of functions in the code file are run.

3. The computer-implemented method of claim 1, wherein the visual representation of the expected result is viewable by a user within the code file.

4. The computer-implemented method of claim 1, wherein the visual representation of the expected result is provided at one or more functions of the plurality of functions in the code file.

5. The computer-implemented method of claim 1, wherein the method further comprises generating the log over time.

6. The computer-implemented method of claim 1, further comprising generating the log, wherein generating the log comprises:
   executing a function;
   obtaining an execution response to the function; and
   logging the function as a historical function in the log.

7. The computer-implemented method of claim 6, wherein generating the log further comprises logging the execution response corresponding to the historical function in the log.

8. The computer-implemented method of claim 7, wherein the function is performed in:
   a debug mode; or
   a test mode.

9. The computer-implemented method of claim 1, wherein the method further comprises obtaining one or more historical parameters for executing the one or more historical functions, and wherein the log further comprises the one or more historical parameters.

10. The computer-implemented method of claim 9, wherein the first function and the second function in the code file comprise one or more parameters for executing the first function and the second function, and wherein the method further comprises:

comparing the one or more parameters to the one or more historical parameters; and determining that at least one of the first function and the second function match the at least one of the one or more historical functions in the log based on the comparison.

11. The computer-implemented method of claim 1, wherein the method further comprises:

receiving a new function at the code file by way of a user input;

responsive to determining the new function matches a second historical function in the log, resulting in a second matching historical function:

identifying the execution response corresponding to the second matching historical function in the log; and determining an expected result of the new function based on the identified execution response.

12. The computer-implemented method of claim 1, wherein at least one of the first function and the second function in the code file comprises one or more subsidiary functions, and wherein the method further comprises:

responsive to determining the one or more subsidiary functions match one or more historical functions in the log:

identifying the execution responses corresponding to the one or more matching historical functions in the log; and predicting one or more expected results of the plurality of functions based on the identified execution responses.

13. A system for obtaining one or more expected results of a plurality of functions in a code file, the plurality of functions comprising a first function and a second function, the system having one or more computer processors, and the system configured to:

whether the first function and the second function matches at least one of a one or more historical functions in a log of previously executed functions and their corresponding execution responses;

responsive to determining that at least one of the first function and the second function matches at least one of the one or more historical functions in the log, resulting in one or more matching historical functions:

identify one or more execution responses corresponding to the one or more matching historical functions in the log;

determine one or more expected results of the plurality of functions based on the identified one or more execution responses;

generate a visual representation of the one or more expected results in an interactive development environment; and execute at least one of the first function and second function.

14. The system of claim 13, further configured to generate the log over time.

15. The system of claim 14, further configured to generate the log, wherein generating the log comprises:

executing a function;

obtaining an execution response to the function; and logging the function as a historical function in the log.

16. A computer program product comprising a computer readable storage medium having program instructions embodied therewith, the program instructions executable by a server to cause the server to perform a method for obtaining one or more expected results of a plurality of functions in a code file, the plurality of functions comprising a first function and a second function, the method comprising:

determining whether the first function and the second function matches at least one of a one or more historical functions in a log of previously executed functions and their corresponding execution responses;

responsive to determining that at least one of the first function and the second function matches at least one of the one or more historical functions in the log, resulting in one or more matching historical functions:

identifying one or more execution responses corresponding to the one or more matching historical functions in the log;

determining one or more expected results of the plurality of functions based on the identified one or more execution responses;

generating a visual representation of the one or more expected results in an interactive development environment; and executing at least one of the first function and second function.

17. The computer program product of claim 16, wherein the method further comprises generating the log over time.

* * * * *